United States Patent [19]

Ernst et al.

[11] 4,158,706
[45] Jun. 19, 1979

[54] FOOD PRESERVATION

[75] Inventors: Thomas J. Ernst, Belleville, Ill.; Edward V. Oborsh, Ballwin; Foppe E. Oreel, St. Louis, both of Mo.

[73] Assignee: Ralston Purina Company, St. Louis, Mo.

[21] Appl. No.: 818,791

[22] Filed: Jul. 25, 1977

Related U.S. Application Data

[63] Continuation-in-part of Ser. No. 377,488, Jul. 9, 1973, abandoned.

[51] Int. Cl.² .............................................. A23B 4/12
[52] U.S. Cl. .................................. 426/327; 426/335; 426/573; 426/657; 426/332; 426/805
[58] Field of Search ............... 426/327, 657, 332, 523, 426/335, 524, 661, 321, 573, 513, 805; 424/317

[56] References Cited

U.S. PATENT DOCUMENTS

| | | | |
|---|---|---|---|
| 2,622,032 | 12/1952 | Frandsen | 426/332 |
| 3,556,805 | 1/1971 | Conn et al. | 426/24 |
| 3,694,224 | 9/1972 | Rubio | 426/335 |

OTHER PUBLICATIONS

Chemical Abs., vol. 40, 1946, art. 1949.
Poultry Science, vol. 44, pp. 582–586, 1965, Mountney.

Primary Examiner—Hiram H. Bernstein
Attorney, Agent, or Firm—W. Dennis Drehkoff

[57] ABSTRACT

A method of preparing stable high moisture food products such as pet food products is disclosed which enables nutritious farinaceous-proteinaceous food materials to be preserved in a stable, nutritious and wholesome form without refrigeration or resorting to canning and autoclaving techniques. The preserved materials may be packaged in transparent, flexible containers and stored under ambient conditions for periods of a year or more. The method involves impregnating the materials with a preservative such as succinic acid, pyruvic acid, or fumaric acid, forming the materials, and packaging the formed food product.

12 Claims, 1 Drawing Figure

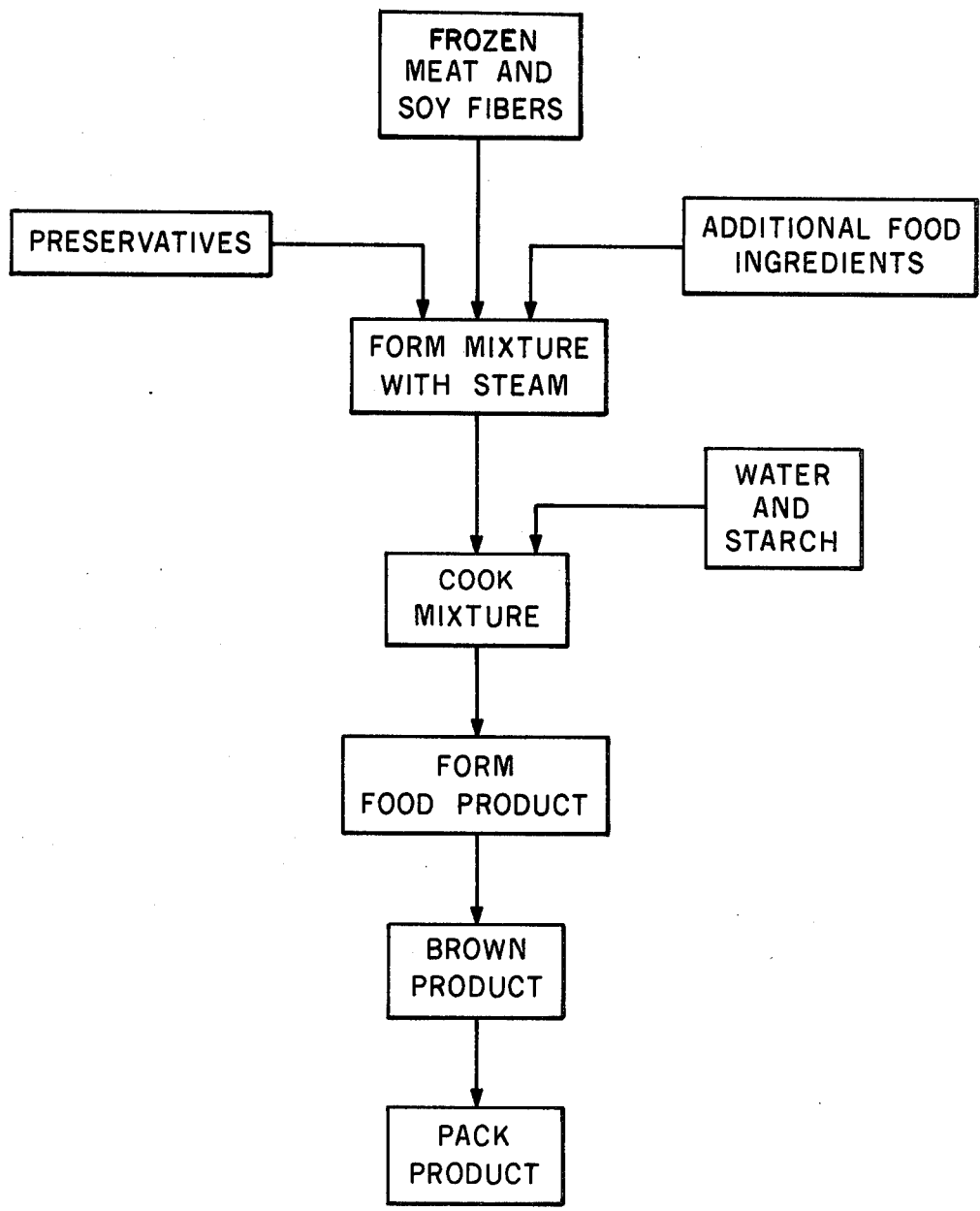

FOOD PRESERVATION

This is a continuation of application Ser. No. 377,488, filed on July 9, 1973, now abandoned.

BACKGROUND OF THE INVENTION

Preservation of food materials is a problem which continually confronts the food industry, particularly the pet food industry where canning methods are not in all instances possible or desirable. In the pet food industry, and also in the human food industry, food materials are commonly marketed in three forms: dry products, intermediate moisture products, and high moisture products. Dry products are commonly cereal type materials and due to their low moisture content, about 10% by weight or less, they are very stable and resist mold growth and bacterial spoilage. Intermediate moisture products have a moisture content of about 25 to 40% by weight. Due to the higher moisture content of the intermediate moisture products, they must be stabilized with preservatives to provide sufficient bacteriastatic and antimycotic activity in the material to give it an acceptable shelf life. Sugar, salt, sodium and potassium sorbate, sorbic acid and many other preservative materials have been used to preserve intermediate moisture materials. Due to the high stability of dry and intermediate moisture products, they can be packaged in relatively inexpensive paper or polymer film containers and kept in an ambient environment for long periods of time without spoiling. The materials do not require refrigeration after packaging.

High moisture products such as canned pet food have a moisture content of from about 50 to 80% or more by weight. The high moisture level of the material has required that the material be sterilized after canning in order to prevent spoilage from bacterial and mold growth if a shelf life of more than a few days is desired. The ease with which high moisture material spoils has required that the product be sterilized and remain sealed in the can if it is stored at room conditions. Once a can of high moisture product is opened, it spoils rapidly unless it is refrigerated.

SUMMARY OF THE INVENTION

We have discovered a method of producing high moisture food materials such as a high moisture pet food which enables us to package the materials in inexpensive packaging and to store the materials under room temperature conditions for long periods of time. The materials are palatable, stable and will not support bacterial or mycotic growth. The materials can be packaged by simple, inexpensive processes and do not require expensive canning and sterilizing techniques to preserve them. The combined foods will typically be packaged as several single portion units combined together to provide convenience for the purchaser. High moisture materials which are suitable for human consumption may be prepared and packaged equally as well. The process of the invention has the unique advantage of allowing the high moisture proteinaceous-farinaceous materials to be preserved in a marketable state without canning for times much beyond their normal shelf life and without the use of high levels of palatability reducing and nutritionally harmful or degrading preservatives.

The process of preparing foods having moisture contents of from about 50 to 80% or more by weight involves impregnating the moist farinaceous-proteinaceous materials with an effective amount of a preservative selected from the group consisting of succinic acid, pyruvic acid, fumaric acid or mixtures thereof. Typically, a range of about 1.5 to 3.0% by weight of preservative would be used depending on the product to be preserved, its moisture content, and the expected conditions of storage. Longer times and higher temperatures generally require a greater quantity of preservative than short time cool conditions. The preservative is added to the farinaceous-proteinaceous ingredients and to any additional dry ingredients such as vitamins and minerals, dyes, flavoring, and auxilliary preservatives if used. The mixed ingredients containing an effective amount of preservative is then subjected to a heat treatment which is effective to cooperate with the preservative system to substantially reduce the initial bacterial count of the food materials and preserve the product from growth resulting from subsequent contamination. The heat treatment serves also to cook the farinaceous-proteinaceous food ingredients and increase the palatability of the final product. After the heat treatment, the cooked, preserved materials are formed into food articles, such as chunks, patties, or strands, and packaged. The packaging will normally be of the simple wrap type using a paper or polymer film. Polypropylene, foil wrap, and polyvinyl chloride films have proven satisfactory as packaging materials. Products wrapped in these materials have exhibited a long stable shelf life even when stored under ambient and higher temperatures.

DESCRIPTION OF THE DRAWINGS

The FIGURE is a schematic drawing of a process of preparing a high moisture pet food utilizing the process of the invention.

DESCRIPTION OF THE PREFERRED EMBODIMENTS

The process of the invention has proven to be extremely effective in preserving high moisture pet food product formed from farinaceous and proteinaceous components such as meats, fish, and poultry which have a high natural moisture content and which also have a high level of bacterial contamination as received. A product of this type typically has a moisture content above 50% by weight (method of Karl Fischer), for example 75% by weight. In addition to meat sources, the product would also typically contain other nutritious materials to provide a nutritionally balanced food product. The other nutrient materials in addition to meat would chiefly be proteinaceous and farinaceous food sources, vitamins and minerals. By meat, fish, poultry, farinaceous food sources, proteinaceous food sources, vitamins and minerals, we mean those food nutrient sources which are well known in the art and which are used in animal foods. Materials in these categories are well known in the art and are described in references and literature well known in the art, for example, in U.S. Pat. No. 3,119,691, in *The Feed Bag Red Book*, or in *USDA Handbook No. 8*, for example.

The product may contain additional nutritional, therapeutic or modifying components necessary to provide a satisfactory ration, i.e., one having the complete nutritional and physical properties desired. For example, the solids may contain the vitamin, mineral, protein, energy, and therapeutic materials needed for adequate health and nutrition of the animal for which the food product is designed.

The final product may contain additional stabilizing, coloring and flavoring ingredients in addition to the preservative materials used in order to promote specific coloring or flavoring effects, but such materials will not normally be of the palatability reducing or degrading type or, if necessary, their use will be minimal. The standard FD&C food colors, BHA, BHT, smoke flavor, hamburger flavor, minerals and vitamins are materials which may easily be added to the products of our invention. It is expected that the product may also contain additional optional nutritional and therapeutic materials to improve or increase the nutritional value of the final product, to render the product nutritionally complete or therapeutically more desirable.

The process of the invention is practiced by combining the preservative with the food material to be preserved in an amount which is effective to achieve the desired preservative effect and subjecting the combined food and preservative to mixing sufficient to distribute the preservative throughout the food matrix. The mixture is then subjected to a heat treatment which cooperates with the preservative to substantially reduce the initial bacterial count. The heat treatment need not be as severe as that normally used in canning and autoclaving techniques. Typically, product temperatures of 120° F. to 190° F. may be used and the time of heating may vary from five to sixty minutes or more, if desired. A temperature of about 165° F. for 5 minutes is about optimum.

By mixing the preservative throughout the food matrix, the preservative is able to cooperate effectively with the heat treatment and reduce the initial level of bacterial contamination to a very low level on the order of one thousand per gram or less. This reduction is achieved even with very contaminated nutrient sources such as meats which may have an initial bacterial count of five million or more per gram when received. When the level of contamination is thus reduced, the preservative is effective to maintain the stability of the food product under storage at ambient conditions such as those normally encountered in nonrefrigerated storage warehouses in the United States. The temperature conditions of storage would typically vary between 40° F. and 140° F., depending on the season. The preserved product can remain stable under these conditions for a year or more. To achieve this stability, it is not necessary to use packaging materials and techniques which totally prevent recontamination of the food product. Flexible films have proven to be quite satisfactory as packaging materials.

Typically, the process of producing a high moisture product by the method of the invention will start by coarsely grinding the meat ingredients such as beef, poultry and/or fish. Grinding is preferably accomplished while the meat is frozen as we have found that this results in a firmer product. Additional proteinaceous or farinaceous materials, vitamins or other nutrients, may be added to the meats at this stage of processing if desired, for example, rehydrated protein fibers such as those disclosed in U.S. Pat. No. 3,496,858 to Jenkins may be added.

The meat mixture of frozen meat and additional components may then typically be heated in a steam jacketed kettle to a temperature of between about 120° to 135° F. to melt the frozen meat and partially cook the mixture. To this partially cooked component are then added various nutritional components and a preservative material, typical heat stable vitamins, flavors, additional animal fat if needed, minerals and a thickening agent may be added at this stage. The thickening agent is added to give body to the high moisture formed product. Typical thickening agents are heat setting starches, cereal flours, gums, egg albumen, wheat gluten, vegetable gums, synthetic gums and proteins. This mixture is then mixed for a suitable time to thoroughly disperse all of the ingredients, for example, five minutes; and the mixture is then heated in the steam jacketed kettle to a temperature of approximately 135° to 180° F. to thicken and give body to the mixture. To this thickened mixture, additional components may be added, if desired. Water may be added to the mixture at this stage to adjust the moisture content to the desired level and to replace the moisture which has been lost from the initial ingredients due to evaporation. Another thickening agent may be added at this step of the process to provide an additional thickening and retain the moisture in the product, if desired. This extra thickening component has been found to be highly desirable if a firm patty structured product is to be produced. The formed product is then mixed to thoroughly disperse any added materials at this stage and cool to a temperature of approximately 90° F. for forming. Cooling is not absolutely essential, but the forming process may be performed much more rapidly if the cooked mixture is held at this temperature prior to forming. The mixture is then formed into the desired shape, for example, patties, by using a patty forming machine. The formed patties may then be processed to provide additional characteristics, for example, by browning the surface to give a desirable charcoal broiled effect to the product and additional flavors may be added to the surface. To further illustrate the process to those skilled in the art, the following Examples are included but are not intended to limit the scope of the invention claimed.

EXAMPLE 1

Fifteen pounds of carcass beef, fifteen pounds of lungs, and ten pounds of whole chicken were ground while frozen and mixed in a Ross Double Planetary Mixer ® with 8.5 pounds of expanded soy fibers which had been rehydrated in 24 pounds of water. Steam was introduced to the jacket of the mixer until the frozen meats had thawed and the temperature reached 135° F. To the thawed, partially cooked meat portion was added 2% animal fat, 1.5% vitamins and minerals, 10% meat and bone meal, 0.3% potassium sorbate, 0.3% sorbic acid, 1.0% phosphoric acid, 5% of a heat thickening starch (National #10) and the succinic acid preservative material. The percentages were based on the total formulation. The product was then mixed until the additional components were thoroughly dispersed. The product was heated to 180° F. The heating was terminated when the heat thickening starch began to gel and the thickening effect was noticeable in the mixture. Then an instant starch such as Instant TexAid ® and additional water to bring the moisture content of the mixture up to 51% by weight was added and mixing was continued for five minutes. At the end of five minutes, a heavy solid product was formed. The product was allowed to cool to a temperature of approximately 90° F. and then formed on a patty forming machine into hamburger type patties approximately 3 inches in diameter and ¾ inch thick. The formed patties were then passed beneath an open flame which charred the surface of the patties slightly to impart a charcoal broiled appearance. After the char operation a dispersion of garlic oil and additional vitamins were sprayed on the surface of the formed charred patties at a level of 0.015% by weight of the total patty and the formed patty was then packaged in plastic bags. Individual patties were placed in each bag. Samples of the product were prepared in this manner containing 0% succinic acid addition, 1.5% succinic acid addition, and 3% succinic acid addition. Parallel tests were conducted with samples innoculated to contain approximately 2,000 organisms per gram. The samples were stored and examined periodically for signs of spoilage. The results of the storage tests are shown in Table I.

EXAMPLE 2

Fifteen pounds of carcass beef, fifteen pounds of lungs, and ten pounds of whole chicken were ground while frozen and mixed in a Ross Double Planetary Mixer ® with 8.5 pounds of expanded soy fibers which had been rehydrated and 24 pounds of water. Steam was introduced to the jacket of the mixer until the frozen meats had thawed and the temperature reached 135° F. To the thawed, partially cooked meat portion was added 2% animal fat, 1.5% vitamins and minerals, 10% meat and bone meal, 0.3% potassium sorbate, 0.3% sorbic acid, 1.0% phosphoric acid, 5% of a heat thickening starch, such as National #10 ®, and fumaric acid preservative material. The percentages were based on the total formulation. The product was then mixed until the additional components were thoroughly dispersed. The product was heated to 180° F. The heating was terminated when the heat thickening starch began to gel and the thickening effect was noticeable in the mixture. Then an instant starch such as Instant TexAid ® and additional water to bring the moisture content of the mixture up to 51% by weight was added and mixing was continued for five minutes. At the end of five minutes, a heavy solid product was formed. The product was allowed to cool to a temperature of approximately 90° F. and then formed on a patty forming machine into hamburger-type patties approximately 3 inches in diameter and ½ inch thick. The formed patties were then passed beneath an open flame which charred the surface of the patties slightly to impart a charcoal broiled appearance. After the char operation, a dispersion of garlic oil and additional vitamins were sprayed on the surface of the formed charred patties at a level of 0.015% by weight of the total patty and the formed patty was then packaged in plastic bags. Individual patties were placed in each bag. Samples of the product were prepared in this manner containing 0% fumaric acid addition, 1.5% fumaric acid addition, and 3% fumaric acid addition. Parallel tests were conducted with samples innoculated to contain approximately 2,000 organisms per gram. The samples were stored and examined periodically for signs of spoilage. The results of the storage tests are shown in Table II.

EXAMPLE 3

Fifteen pounds of carcass beef, fifteen pounds of lungs, and fifteen pounds of whole chicken were ground while frozen and mixed in a Ross Double Planetary Mixer ® with 8.5 pounds of expanded soy fibers which had been rehydrated and 24 pounds of water. Steam was introduced to the jacket of the mixer until the frozen meats had thawed and the temperature reached 135° F. To the thawed, partially cooked meat portion was added 2% animal fat, 1.5% vitamins and minerals, 10% meat and bone meal, 0.3% calcium proprionate, 1.0% phosphoric acid, 5% of a heat thickening starch, such as National #10 ®, and pyruvic acid preservative material. The percentages were based on the total formulation. The product was then mixed until the additional components were thoroughly dispersed. The product was heated to 180° F. The heating was terminated when the National #10 ® heat thickening starch began to gel and the thickening effect was noticeable in the mixture. Then an instant starch such as Instant TexAid ® and additional water to bring the moisture content of the mixture up to 51% by weight was added and mixing was continued for five minutes. At the end of five minutes, a heavy solid product was formed. The product was allowed to cool to a temperature of approximately 90° F. and then formed on a patty forming machine into hamburger-type patties approximately 3 inches in diameter and ½ inch thick. The formed patties were then passed beneath an open flame which charred the surface of the patties slightly to impart a charcoal broiled appearance. After the char operation a dispersion of garlic oil and additional vitamins were sprayed on the surface of the formed charred patties at a level of 0.015% by weight of the total patty and the formed patty was then packaged in plastic bags. Individual patties were placed in each bag. Samples of the product were prepared in this manner containing 1.5% pyruvic acid addition. The samples were stored and examined periodically for signs of spoilage. The results of the storage tests are shown in Table III.

TABLE I

| Control | | 1.5% Succinic Acid | | | 3.0% Succinic Acid | | Time |
|---|---|---|---|---|---|---|---|
| Sample | Innoculated Sample | Sample 1 | Sample 2 | Innoculated Sample | Sample | Innoculated Sample | (weeks) |
| 110 | $46 \times 10^4$ | 20 | <10 | $20 \times 10^2$ | 20 | $14 \times 10^2$ | 0 |
| $33 \times 10^5$ | $39 \times 10^5$ | 50 | <10 | $40 \times 10^2$ | <10 | $30 \times 10^2$ | 1 |
| $>30 \times 10^6$ | $>30 \times 10^6$ | 20 | 30 | $22 \times 10^2$ | <10 | $12 \times 10^2$ | 2 |
| $29 \times 10^6$ | $30 \times 10^6$ | 50 | 20 | $15 \times 10^2$ | 10 | $11 \times 10^2$ | 5 |
| $>30 \times 10^6$ | $>30 \times 10^6$ | 10 | 50 | $25 \times 10^2$ | 20 | 600 | 9 |
| | | 50 | 50 | 900 | <100 | 250 | 15 |
| terminated at 9 weeks - spoiled | | $>30 \times 10^5$ | still in test | | still in test | | 20 |
| | | 30 | | | | | 26 |
| | | still in test | | | | | |

*bad sample

TABLE II

| Control (same as Table I) | | 1.5% Fumaric Acid | | | 3.0% Fumaric Acid | | Time |
|---|---|---|---|---|---|---|---|
| Sample | Innoculated Sample | Sample 1 | Sample 2 | Innoculated Sample | Sample | Innoculated Sample | (weeks) |
| 110 | $46 \times 10^4$ | 20 | 30 | $15 \times 10^2$ | <10 | $25 \times 10^2$ | 0 |
| $33 \times 10^5$ | $39 \times 10^5$ | 60 | 10 | $15 \times 10^2$ | <10 | $42 \times 10^2$ | 1 |
| $>30 \times 10^6$ | $>30 \times 10^6$ | <10 | 30 | $12 \times 10^2$ | 20 | 580 | 2 |
| $29 \times 10^6$ | $30 \times 10^6$ | <10 | 40 | 500 | 60 | 30 | 5 |
| $>30 \times 10^6$ | $>30 \times 10^6$ | 10 | 30 | 300 | 30 | 60 | 9 |
| | | 30 | 30 | 110 | <10 | <10 | 15 |
| terminated at 9 weeks - spoiled | | 30 | still in test | | still in test | | 20 |
| | | <10 still in test | | | | | 26 |

Bacterial Count (organisms per gram)

TABLE III

| 1.5% PYRUVIC ACID | TIME |
|---|---|
| Sample | (weeks) |
| $20 \times 10^2$ | 0 |
| $34 \times 10^2$ | 1 |
| $48 \times 10^2$ | 3 |
| $54 \times 10^2$ | 5 |
| $37 \times 10^2$ | 9 |
| $68 \times 10^2$ | 15 |
| $40 \times 10^2$ | 20 |
| $42 \times 10^2$ | 26 |

Bacterial Count (organisms per gram)

We claim:

1. A method of producing a nutritionally and therapeutically beneficial pet food material having a long shelf life and resistance to bacterial and mold spoilage on storage under ambient conditions and in conventional packaging materials which are permeable to bacterial penetration comprising mixing nutritious, proteinaceous-farinaceous food sources comprising meat components which are ground in a frozen condition, and then subjected to a heat treatment to melt the frozen meat and partially cook it prior to addition of the additional components of the mixture, with a preservative material selected from the group consisting of succinic acid, fumaric acid, pyruvic acid or mixtures thereof in an amount effective to substantially reduce the initial bacterial contamination of the food components when subjected to heat, and effective to preserve the heat treated food from subsequent bacterial contamination and growth of storage under ambient conditions; adding a heat thickening agent to the mixture; heating the preservative treated mixture for a time and at a temperature effective to cooperate with the preservative treatment to substantially reduce bacterial contamination of the pet food and preserve the food from subsequent bacterial contamination and growth; and effective to heat set the thickening agent to form a moldable mixture; and subsequently forming the mixture into formed particles.

2. The method of claim 1 wherein the formed food particles are subjected to a surface browning step prior to packaging.

3. The method of claim 1 wherein the additional thickening agent is added to the mixture prior to forming.

4. The method of claim 1 wherein the product contains expanded protein fibers.

5. The method of claim 1 wherein the mixture is cooled to a temperature of approximately 90° F. prior to forming into molded food particles.

6. The method of claim 1 wherein the preservative material is added to the mixture at a level above about 1.5% by weight.

7. The method of claim 1 wherein the preservative was added to the mixture at a level of between about 1.5 to 3% by weight.

8. The method of claim 6 wherein the preservative material is succinic acid.

9. The method of claim 6 wherein the preservative material is pyruvic acid.

10. The method of claim 6 wherein the preservative material is fumaric acid.

11. The method of claim 6 wherein the formed food product has a moisture content above about 50% by weight.

12. The method of claim 1 wherein the thickening agent is selected from the group consisting of heat setting starches, cereal flours, egg albumen, wheat gluten, vegetable gums, synthetic gums, proteins and mixtures thereof.

* * * * *

UNITED STATES PATENT AND TRADEMARK OFFICE
CERTIFICATE OF CORRECTION

PATENT NO. : 4,158,706
DATED : June 19, 1979
INVENTOR(S) : Thomas J. Ernst et al It is certified that error appears in the above-identified patent and that said Letters Patent are hereby corrected as shown below:

In Columns 5 & 6, at Table I, line 59, 6th column, $\angle 100$ should read $\angle 10$ line 61, 3rd column, $>30 \times 10^5$ should read $*>30 \times 10^5$ Signed and Sealed this Sixth Day of November 1979

[SEAL]

Attest:

RUTH C. MASON
Attesting Officer

LUTRELLE F. PARKER
Acting Commissioner of Patents and Trademarks